(No Model.) 2 Sheets—Sheet 1.
W. MASON.
DETACHABLY UNITING BARRELS TO STOCKS.
No. 605,111. Patented June 7, 1898.
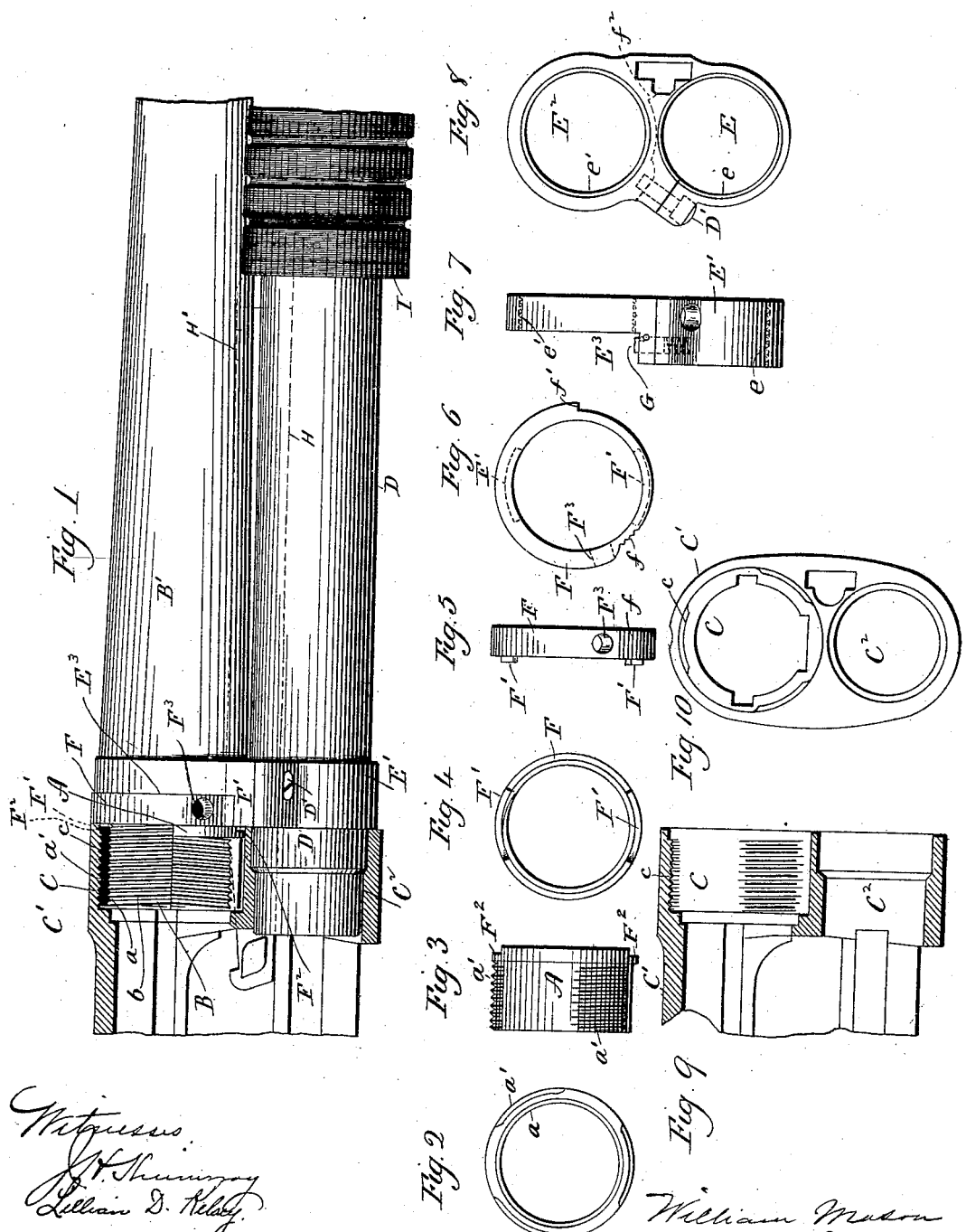
Witnesses
William Mason
Inventor (No Model.) 2 Sheets—Sheet 2.
W. MASON.
DETACHABLY UNITING BARRELS TO STOCKS.
No. 605,111. Patented June 7, 1898.
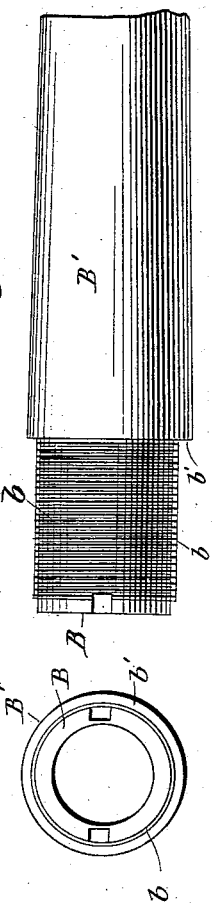
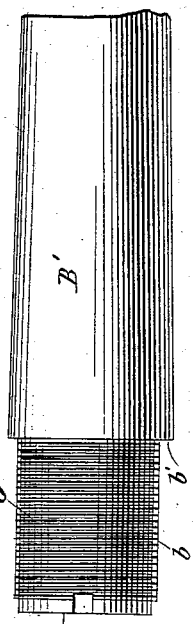
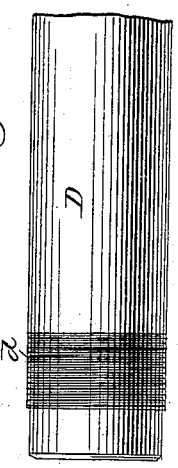
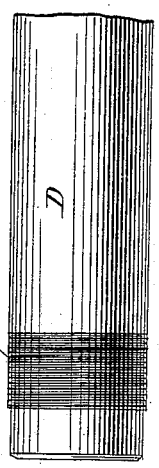
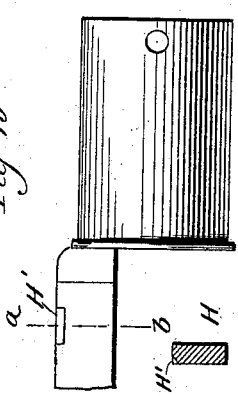
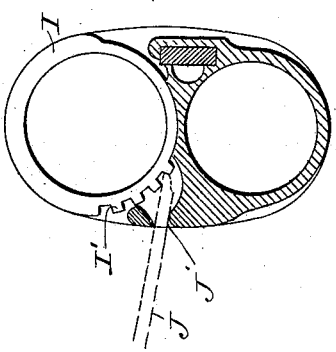
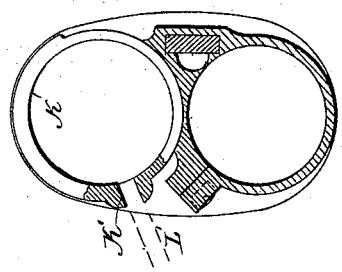

UNITED STATES PATENT OFFICE.

WILLIAM MASON, OF NEW HAVEN, CONNECTICUT, ASSIGNOR TO THE WINCHESTER REPEATING ARMS COMPANY, OF SAME PLACE.

DETACHABLY UNITING BARRELS TO STOCKS.

SPECIFICATION forming part of Letters Patent No. 605,111, dated June 7, 1898.

Application filed December 13, 1897. Serial No. 661,645. (No model.)

*To all whom it may concern:*

Be it known that I, WILLIAM MASON, of New Haven, in the county of New Haven and State of Connecticut, have invented a new Improvement in Take-Down Guns; and I do hereby declare the following, when taken in connection with the accompanying drawings and the letters of reference marked thereon, to be a full, clear, and exact description of the same, and which said drawings constitute part of this specification, and represent, in—

Figure 1, a broken view, partly in elevation and partly in vertical section, of one form which a gun containing my invention may assume; Fig. 2, a detached view, in rear elevation, of the take-up sleeve; Fig. 3, a view thereof in side elevation; Fig. 4, a view thereof in front elevation; Fig. 5, a view in side elevation of the locking-ring; Fig. 6, a view thereof in front elevation; Fig. 7, a detached edge view of the band; Fig. 8, a view thereof in front elevation; Fig. 9, a broken view, in vertical section, of the gun-frame; Fig. 10, a front view thereof; Fig. 11, a view of the rear end of the gun-barrel; Fig. 12, a view thereof in side elevation; Fig. 13, a rear end view of the magazine; Fig. 14, a broken view thereof in side elevation; Fig. 15, a detached broken view, in side elevation, of the action-bar, showing the sleeve at its forward end, by means of which it is connected with the sliding handle; Fig. 16, a sectional view of the bar on the line $a\,b$ of Fig. 15; Fig. 17, a view, partly in section and partly in elevation, of one of the modified constructions which my invention may assume; Fig. 18, a corresponding view of another modification.

My invention relates to an improvement in that class of guns known to the trade as "take-down" guns, for the reason that they are adapted to have their barrels readily connected with and detached from their frames, so as to permit the gun to be packed more compactly for the purposes of transportation.

My present invention relates to a take-down gun of the class having tubular magazines, the object being to produce a simple and convenient gun of the particular character last described, in which the barrel and magazine are connected with and disconnected from the receiver without rotating either of them and in which provision is made for taking up the wear resulting from repeatedly taking down and reassembling the gun.

With these ends in view my invention consists in certain details of construction and combinations of parts, as will be hereinafter described, and pointed out in the claims.

In carrying out my invention as herein shown I employ a take-up sleeve A, which is formed with continuous internal threads $a$ and interrupted external threads $a'$. This sleeve is mounted upon the reduced butt-end B of the barrel B', the said butt-end of the barrel being formed with continuous threads $b$, and an annular shoulder $b'$ being formed between the butt-end of the barrel and the barrel proper. The interrupted external threads $a'$ of the said take-up sleeve take into correspondingly-interrupted threads $c$, formed within a barrel-receiving opening C, formed in the upper portion of the forward end of the gun-frame C', the lower portion of the said forward end of the frame being formed with a magazine-receiving opening $C^2$, which is not threaded, but which is adapted to receive the rear end of a tubular magazine D, formed at a point just forward of its rear end with a continuous thread $d$, taking into a continuous thread $e$, formed in the magazine-opening E of the band E', the upper portion of which is formed with a barrel-opening $E^2$, having a continuous thread $e'$, which takes into the continuous thread $b$ of the butt-end B of the barrel. The band E' aforesaid has the rear face of its upper end cut away to form a recess $E^3$, which receives the locking-ring F, which is formed independently of the take-up sleeve and which slips over the threads $b$ of the butt-end B of the barrel and which is interposed between the upper end of the band E' and the forward edge of the take-up sleeve A. Upon its rear edge the locking-ring is formed with two segmental coupling-lugs F' F', located at diametrically opposite points and adapted to enter segmental coupling-notches $F^2$ $F^2$, formed in the forward edge of the take-up sleeve, whereby the said sleeve and ring are coupled together for simultaneous rotation. The take-up sleeve is rotated in one direction or the other by means of the locking-ring, which is rotated by the application to it of a key or wrench of any approved construction. As herein shown, the locking-ring is provided with a keyhole F³ for the reception of a spanner-wrench, which is not shown. The locking-ring is itself normally held against rotation by the provision of its external periphery with a few teeth $f$, which coact with a spring-actuated dog G, mounted in the band at a point directly below the recess E³, formed therein for the reception of the ring. When the ring is turned in one direction or the other, it rides over the said dog, which at other times holds it against rotation. The ring is also prevented from a complete rotation, except when the gun is open, by means of a locking-shoulder $f'$, formed upon its external periphery in position to normally engage with the upper edge of the action-bar H, which extends rearward from the sliding and supporting handle I, which is mounted upon the magazine D. The said bar is formed, however, near its forward end with a clearance-notch H', which when the handle is at the limit of its rearward excursion is registered with the locking-ring, so as to clear the locking-shoulder $f'$ thereof. Therefore when the handle is at the limit of its rearward excursion and the gun is open the clearance-notch H' is in position to permit the turning of the locking-ring in one direction or the other. It follows from this construction that the gun cannot be taken down except when it is open, or, in other words, except when the handle and the action-bar are in their rearward positions, and it also follows from this that the gun cannot be put together again except when the handle and action-bar are in their rear positions, whereby all danger of accidentally exploding a cartridge which may have been left in the gun-barrel at the time of taking the gun down is avoided, for it will of course be understood that when the action-bar is at the limit of its rearward position the breech-block, together with the firing-pin, is in its open position.

To take down a gun constructed in accordance with my invention, a key or spanner-wrench or other equivalent implement is applied to the locking-ring and the same turned sufficiently to disengage the external interrupted threads of the take-up sleeve which turns with it from the corresponding interrupted threads of the barrel-receiving opening of the gun-frame. Then when the ring and sleeve have been turned, as described, the barrel and magazine may be drawn straight away from the gun-frame and without rotating either of them; but prior to turning the ring, as described, the gun must be opened by drawing the handle back to the limit of its rearward excursion, so as to bring the clearance-notch of the action-bar into registration with the locking-ring. Then after the barrel and magazine have been disconnected from the gun-frame the ring is turned back to its normal position, which permits the handle to be pushed forward to the limit of its forward excursion, whereby the action-bar is also drawn into its retired position. Now when it is desired to reassemble the gun the handle and action-bar are again drawn back to the limit of their rearward excursions, so as to bring the clearance-notch of the handle into registration with the locking-ring, which is then turned, and with it the take-up sleeve, so as to bring the external interrupted threads of the take-up sleeve into right relation with the internal interrupted threads of the barrel-receiving opening to permit the sleeve and barrel to be introduced into the said opening, after which the ring and sleeve are again turned to secure the barrel in place. Here I may remark that the ring is prevented from being turned too far by the engagement of the locking-shoulder $f'$ of the ring with a stop-shoulder $f^2$, formed upon the band, as seen in Fig. 8 of the drawings. It will thus be seen that instead of turning the barrel the ring and the take-up sleeve are turned, whereby the barrel is connected with and disconnected from the gun-frame by a straight movement. In this connection I may also mention that the lower portion of the band itself is split and provided with a clamping-screw D', which permits the band to be firmly clamped upon the magazine and the same prevented from rotation.

In case either the internal or external threads of the take-up sleeve should become worn such wear may be compensated for by rotating the sleeve and ring, there being enough range in the locking-teeth of the ring to permit all the rotation required, as only a very slight range of rotation is required for take-up purposes. The sleeve and ring are rotated in the direction that will cause the sleeve to be moved rearward and slightly away from the ring, which will retain its normal lateral position. The movement of the sleeve away from the ring will always be very much less than is provided for in the depth of the coupling-lugs F' F', so that although the sleeve is moved away from the ring it still remains coupled therewith.

In the modified construction shown by Fig. 17 of the drawings the locking-ring I is formed with comparatively strong teeth I', which permit it to be engaged by a lever J, which is introduced into the band for the purpose of prying the ring around in one direction or the other through a purchase-opening J' in the band.

In the modified construction shown in Fig. 18 of the drawings the ring K is formed with a heavy perforated boss K' for the reception of a rod L, by means of which it is turned.

In view of the modifications suggested and of others which may obviously be made I would have it understood that I do not limit myself to the exact construction herein shown and described, but hold myself at liberty to make such changes and alterations as fairly fall within the spirit and scope of my invention. I do not broadly claim, however, the threading of the rear end of a tubular magazine, that being shown in United States Letters Patent No. 498,983, granted June 6, 1893, on my own application.

Having fully described my invention, what I claim as new, and desire to secure by Letters Patent, is—

1. In a take-down gun, the combination with a gun-frame having an internally-threaded barrel-receiving opening, of a gun-barrel having its butt-end threaded, an internally and externally threaded take-up sleeve mounted upon the threaded butt-end of the gun-barrel, and taking into the threads of the said barrel-receiving opening, and a locking-ring formed independently of but coupled with the said sleeve, and mounted upon the butt-end of the gun-barrel at a point forward of the sleeve.

2. In a take-down gun, the combination with a gun-frame having an internally-threaded barrel-receiving opening, of a gun-barrel having its butt-end threaded, an internally and externally threaded take-up sleeve mounted upon the threaded butt-end of the gun-barrel, taking into the threads of the barrel-receiving opening, and having its forward edge formed with coupling-slots, and a locking-ring mounted upon the threaded butt-end of the gun-barrel at a point forward of the said sleeve, and having rearwardly-projecting coupling-lugs which enter the said coupling-slots of the sleeve.

3. In a take-down gun, the combination with a gun-frame having an internally-threaded barrel-receiving opening, of a gun-barrel having its butt-end threaded, an internally and externally threaded take-up sleeve mounted upon the threaded butt-end of the gun-barrel, and taking into the threads of the said barrel-receiving opening, a locking-ring formed independently of but coupled with the said sleeve for rotating the same, and means for holding the ring and hence the sleeve normally against rotation in either direction.

4. In a take-down gun, the combination with a gun-frame having an internally-threaded barrel-receiving opening, of a gun-barrel having its butt-end threaded, an internally and externally threaded take-up sleeve adjustably mounted upon the threaded butt-end of the gun-barrel, and taking into the threads of the said barrel-receiving opening, a locking-ring mounted upon the said threaded butt-end of the gun-barrel at a point forward of the said sleeve, and a spring-actuated dog engaging with a serrated portion of the locking-ring for holding the same against rotation.

5. In a take-down gun, the combination with a gun-frame having an internally-threaded barrel-receiving opening, of a gun-barrel having its butt-end threaded, a tubular magazine located below the gun-barrel, a band uniting the butt-ends of the barrel and magazine and having the rear face of its upper end recessed, an internally and externally threaded take-up sleeve mounted upon the threaded butt-end of the gun-barrel, and taking into the threads of the said barrel-receiving opening, and a locking-ring made independently of but coupled for rotation with the sleeve, mounted upon the butt-end of the barrel at a point forward of the sleeve, and located within the recess formed in the said band.

6. In a take-down gun, the combination with a gun-frame having an internally-threaded barrel-receiving opening, and a magazine-receiving opening, of a gun-barrel, a magazine located below the same, a sliding supporting and operating handle mounted upon the magazine, an action-bar connected with and extending rearwardly from the said handle, and adapted at its rear end to be connected with the action mechanism of the gun, an internally and externally threaded take-up sleeve, adjustably mounted upon the threaded butt-end of the gun-barrel, and taking into the threads of the said barrel-receiving opening, and a locking-ring formed independently of the said sleeve, mounted upon the threaded butt-end of the gun-barrel at a point forward of the said sleeve, and coacting with the said action-bar which holds it against rotation except when the handle and bar are at the limit of their rearward excursions when the bar clears the ring and permits the same to be turned.

7. In a take-down gun, the combination with a gun-barrel, of a tubular magazine which is formed with external screw-threads at a point forward of its rear end, and a band applied to the rear ends of the barrel and magazine, formed in its lower portion with an internally-threaded magazine-opening into which the magazine is screwed, having its lower portion split for the expansion and contraction of the said opening, and provided with a clamp by means of which the said opening is contracted and the lower portion of the band firmly clamped upon the threaded portion of the magazine.

In testimony whereof I have signed this specification in the presence of two subscribing witnesses.

WILLIAM MASON.

Witnesses:
THOMAS C. JOHNSON,
DANIEL H. VEADER.